July 22, 1930.  W. H. SCHMITT  1,770,997
STEW PAN COVER
Filed June 28, 1928
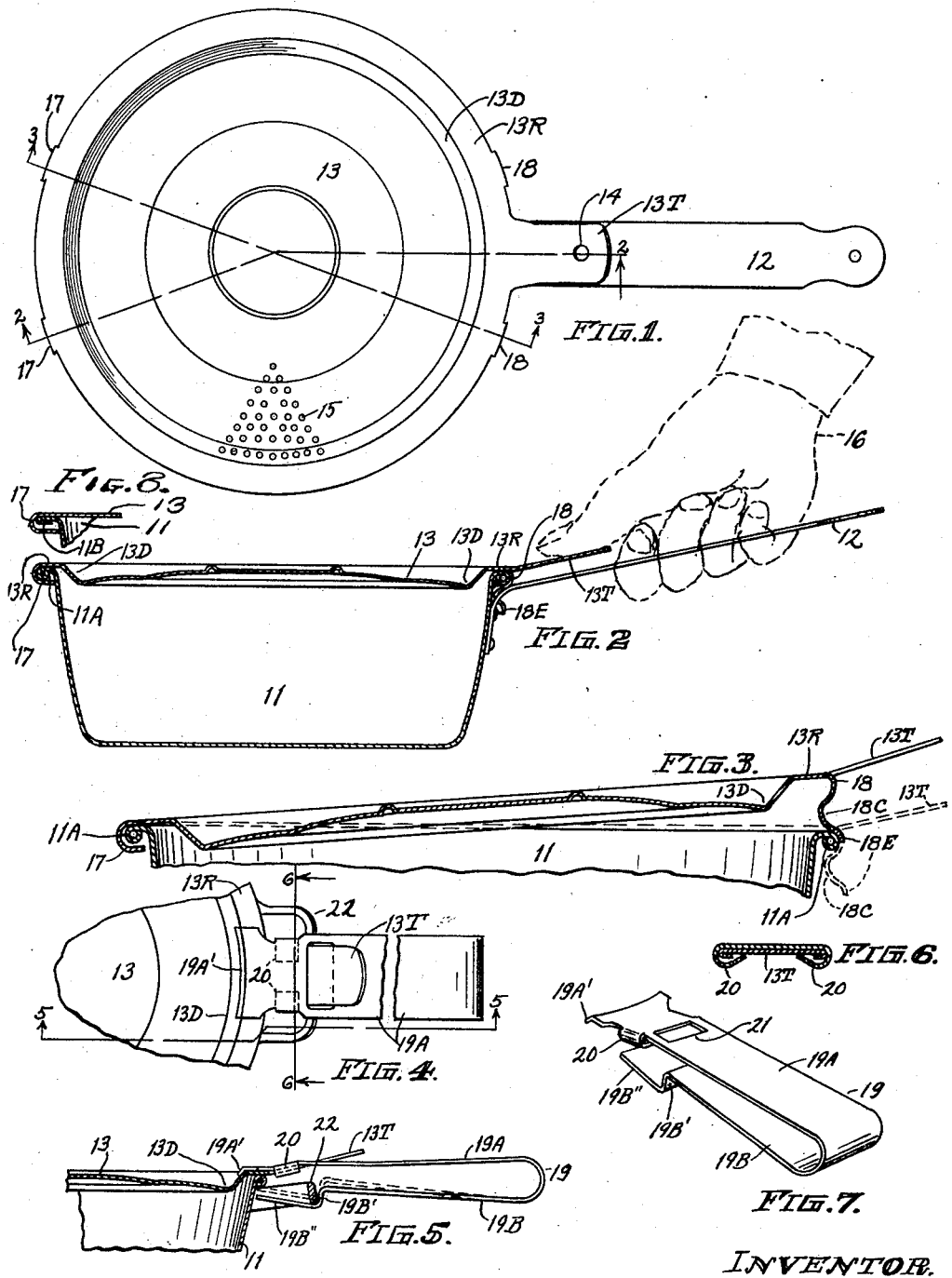
INVENTOR.
William H. Schmitt
BY David E. Carlsen
ATTORNEY.

Patented July 22, 1930

1,770,997

UNITED STATES PATENT OFFICE

WILLIAM H. SCHMITT, OF ST. PAUL, MINNESOTA

STEWPAN COVER

Application filed June 28, 1928. Serial No. 288,988.

This invention relates to an improved lid and handle therefor, for cooking utensils and comprises mainly a divisional application of matter disclosed in Figs. 6 and 7, and claim 5 of my application for patent Serial Number 254,882 filed February 15, 1928. This application further comprises an improvement over said previous application, referring particularly to a removable lid-handle feature, but said handle embodying principles set forth in the previous figures of the original application.

The main object of this invention is to provide a new and simple lid for stew pans, kettles and other vessels having a beaded or otherwise outwardly directed perimetral opening, and further means associable only with such type of lid to engage certain parts of the latter and serve as a handle to engage the lid and the vessel simultaneously for purposes hereinafter fully set forth and as illustrated in the accompanying drawing, in which,—

Fig. 1 is a top view of this improved lid or cover in position on top of a cooking utensil of which only the handle is visible.

Fig. 2 is a longitudinal sectional elevation about as on line 2—2 in Fig. 1 showing a hand in dotted lines grasping the handle of the vessel and also engaging the tongue of my improved lid.

Fig. 3 is an enlarged diametrical cross section about as on line 3—3 in Fig. 1 and showing my improved lid in an inclined position on and over the top edge of a cooking vessel.

Fig. 4 is a fragmentary top view of my improved lid including its tongue part and adjacent parts of the lid, and a removable handle engaging said tongue of the lid directly over the handle of a vessel on which the lid rests.

Fig. 5 is a sectional view longitudinally and to one side of the handle and through certain parts of the vessel and lid approximately as on line 5—5 in Fig. 4.

Fig. 6 is a cross sectional view of the slidably engaged parts of the removable handle and the cover tongue as on line 6—6 in Fig. 4.

Fig. 7 is a perspective view of the handle only.

Fig. 8 is a modified fragmentary sectional view of the extreme upper left part of Fig. 2 showing a flat type of pan bead 11B.

Referring to the drawing by reference numerals, 11 designates any open type of cooking utensil such as a stew pan, kettle or similar vessel having either an outward perimetral bead, as the round bead (Fig. 2) 11A or a perimetral flange such as 11B in Fig. 2 formed by doubling over the edge portion as shown in Fig. 8. 12 is the usual fixed handle of a stew pan and extending radially therefrom said handle being omitted on larger vessels such as kettles on which a bail (not shown) is used.

13 designates the main part of the stew pan lid or cover formed in circular shape to conform to the cooking vessel and having the usual circular depression 13 just inwardly of its outer horizontal flange-rest 13R adapted to lie concentric on the upper rim of a vessel 11. The parts and construction so far described are common to cooking utensils and covers now in universal use and are well known.

A feature of this invention is the provision of an integral tongue 13T of the cover extending radially from one side of it and preferably in a slight upward incline toward its extremity (see Figs. 1 and 2) so that when the cover is in place this tongue is normally above and approximately parallel to the handle 12 of the stew-pan and 14 is an aperture in said tongue providing means for hanging up the cover on a nail or hook. 15 are drain apertures in the cover preferably near its rim in a location about at right angles from a center line drawn through the cover and its tongue (see Fig. 1). 16 in Fig. 2 illustrates a hand (in dotted lines) grasping the handle 12 and the thumb bearing down on the tongue 13T to hold the cover down securely in preparation to tip the stew pan for draining it of liquid contents through the apertures 15.

During this draining process the cover is further securely held in place and concentric of the pan by new and novel means which will now be described.

Referring particularly to Figs. 1, 2 and 3, 17 are a pair of downwardly thence inwardly directed front bead engaging members formed integral with and of the metal of which the cover is made, said members being each thus of U-shape and opening inwardly and located one at each side of a center line of the cover drawn through the tongue 13T and therefore of course being positioned at the opposite edge of the cover from the tongue. These members will hereinafter be designated the front bead engaging members, assuming the tongue 13T to be projecting from the rear of the cover. It will be readily seen that when the cover is concentric on the stew pan these front bead engaging members each extend down outwardly of the vessel bead 11A or 11B, thence extend inwardly under said bead and the extremity of each member may touch the vessel inwardly and just under its bead. At the rear of my improved cover I provide further preferably two downwardly directed curved or horizontally ribbed fingers 18 one near each side of the base of tongue 13T. These fingers are of a certain conformation and for a double purpose namely to retain the cover in flat full contact position on the vessel rim and also to hold the cover in slightly inclined position with its rear end raised above the vessel rim for the main purpose of permitting steam to readily escape from the vessel and simultaneously cool its contents when so desired.

The fingers 18 are integral parts of the cover each extending down from its perimeter and arched inwardly in vertical plane said latter part of both adapted to simultaneously engage the bead of the vessel. Below said inward arch each finger is bent outwardly in a curve designated 18C and terminate in a short downwardly directed curved extremity 18E.

Each finger is thus approximately of S-shape with the lower extremity formed with a short curvature 18E. The entire cover and its front and rear fingers are so designed that in applying the cover to a vessel the front hooks are first engaged with the bead of the vessel, then the rear part of the cover is brought down so that the vessel bead engages the inner and lower curved faces of arches 18C with the extremities 18E outwardly of said bead and resting thereon to thus support the cover in inclined position. At this time the front members 17 straddle the front bead parts of the vessel loosely, but the lower extremities of these members prevent the cover from coming off by any accidental upward movement of the cover (see Fig. 3). To lay the cover flat on the vessel pressure is exerted downwardly on the rear part of the cover, causing the curved parts 18C of the fingers 18 to ride downwardly on bead 11A and spring the said fingers out and simultaneously spring the cover rearwardly so that the front finger members 17 more securely engage the front part of the vessel and its bead 11A—11B, until these curvatures 18C are pressed below the bead when the said rear finger members will snap inwardly as the cover rim part 13R comes down to closing position on the vessel rim, as in Fig. 2.

My improved cover has now been quite fully described but it might be further stated that the proportions of a cover embodying my improved means may be such that the front members 17 and rear members 18 have enough flexibility so one cover may be used on vessels of various sizes of openings.

In larger sizes of cooking utensils such as large capacity kettles it is well known that no handle such as 12 is provided but a bail (not shown) is used for more readily handling such vessels with their comparatively heavy contents.

My improved cover is of course useful for such larger vessels but for such purpose I provide an auxiliary handle applicable only to this type of cover in any size. This handle corresponds in general appearance to that shown in my original application above designated, differing therefrom in that it is removable from the cover and designed in this instance to slidably and frictionally engage the cover tongue 13T and parts of the cover adjacent thereto as will now be described.

The handle comprises a single elongated flat metal bar 19 bent at approximately its middle to form about parallel upper and lower arms 19A and 19B respectively, of which the upper arm is the longer and its extremity formed with a downwardly directed integral flange 19A′ of a curvature transversely in relation to the main handle but concentric of the cover when said flange part is in operative position (see Figs. 4 and 5) namely with said flange engaging the top of the cover at the curvature where its depression 13D is formed. Rearward of said flange part the upper arm of the handle is provided at its opposite side edges with integral downwardly thence inwardly and upwardly directed spring flanges 20 (see Fig. 6) arranged to slidably and frictionally engage the tongue member 13T of the cover by being slipped on said member from its outer end. Outwardly of said flanged part the handle member is provided with a transverse slit 21 from which the tongue 13T protrudes outwardly and up when the handle is in operative position. Thus the tongue 13T is not only retained in said slit but is frictionally engaged at its opposite sides and underneath by the flanges 20 simultaneously, it being readily understood that when the handle is slipped on said tongue it is pushed inward toward the center of the cover until the front flange 19A′ snaps over and down into the shoulder of the cover depression 13D.

As previously stated this handle is useful particularly with covers for large vessels having no handle 12. Such vessels are usually provided with a side hand-hold 22 usually of U-shaped and fixed to the vessel just under its rim, as in Figs. 4 and 5, such handle always being located at half way between the pivot means of the vessel bail. The lower and shorter arm 19B of my removable cover handle is bent down near its free end as at 19B′ providing a shoulder and thence extended forward as a lip 19B″ the front end or extremity of which is normally close to the side of the vessel (see Fig. 5). When in use the said shoulder part 19B′ is arranged to bear lightly against the outer part of the kettle handle 22 and simultaneously the lip 19B″ extends forward toward the vessel wall and between the arms of its U-shaped handle. If there is no handle 22 on the vessel in use the lower arm of the handle is clasped in the usual manner but its lower arm will be sprung upwardly until the end 19B″ engages under the bead of the vessel as shown in dotted lines Fig. 5 providing necessary stability of parts.

It is obvious that when a heavy type cooking utensil is in use and with my improved cover on it, the handle means above described are extremely useful as operated in conjunction with the cover and the vessel and facilitate such handling of heavier kettles and the like.

It will be further understood that in the use of my improved cover, as best illustrated in Fig. 3, such cover must of course be engaged with the vessel rim at the front by drawing it rearwardly into contact while the rear of it is held up in spaced relation to the rear part of the vessel. By then letting down the rear part of the cover its flange extremities 18E first engage and rest on the vessel rim as shown in full lines, or it may be pressed down to common level with the vessel top, the shoulder 18C of the rear fingers 18 merely riding over the beaded edge of the vessel and said fingers occupying the lowest position shown dotted and retaining the cover concentric of the vessel.

Removal of the lid is equally simple, an upward pressure on the rear part of the cover releasing it from the closed position after which the cover is moved forward slightly to be free from contact with the front part of the vessel. Ordinarily a vessel equipped with my cover may be turned to a position with the cover in vertical plane to drain it, without danger of the cover coming off, but if a thumb is pressed against the tongue 13T as in Fig. 2 there is no possibility of the cover becoming loosened from the vessel.

I claim:

1. In a cover for vessels having an outwardly beaded or flanged opening, said cover comprising a sheet metal plate with a circular depression inwardly of and adjacent its perimeter, front vessel engaging means formed integrally of said cover, rear vessel engaging means likewise integral of the cover for yieldingly engaging the outer perimetral part of the vessel opening with the said cover selectively in raised position at its rear or in contact with the container, a tongue integral of said cover adjacent said yieldable means and extending radially therefrom and a handle adapted to be removably engaged on said tongue and adjacent parts of the cover and to simultaneously engage selectively the rim part of the vessel and a fixed handle of said vessel adjacent its rim.

2. The structure specified in claim 1 in which said front vessel engaging means comprise each a downwardly and inwardly curved finger the terminus of which comprises an inwardly directed straight flange parallel to the main cover for the purpose set forth.

3. The structure specified in claim 1 in which said handle comprises a flat metal bar of U-shape in elongated central section, the upper arm longer than the lower, a downwardly directed flange at the forward extremity of the upper arm, and said arm provided with a transverse slit rearward of said front flange, a pair of guiding flanges directed downwardly and thence inwardly from both sides of said upper arm intermediate of its slit and the front end to slidably engage the tongue of the cover, said tongue simultaneously adapted to project upwardly through said slit when the handle is pressed forward on the tongue until said front flange frictionally engages the circular depression of the cover.

4. The structure specified in claim 1 in which said handle comprises a flat metal bar of U-shape in elongated central section, the upper arm longer than the lower, a downwardly directed flange at the forward extremity of the upper arm, and said arm provided with a transverse slit rearward of said front flange, a pair of guiding flanges directed downwardly and thence inwardly from both sides of said upper arm intermediate of its slit and the front end to slidably engage the tongue of the cover, said tongue simultaneously adapted to project upwardly through said slit when the handle is pressed forward on the tongue until said front flange frictionally engages the circular depression of the cover said handle comprising further a transverse shoulder and downward offset of its lower arm and its front end, forward of said off-set terminating in a position close to the side of a vessel when the handle is in connected position with the cover for the purpose described.

5. In combination, a cooking vessel cover for vessels having an outwardly projecting perimetral bead, a handle detachably securable to said cover, means on the front part of said cover for engaging the vessel bead means on the rear part of the cover to yieldingly engage the opposite or rear side of the vessel in selectively inclined or closed positions of the cover, a tongue on said cover adapted to slidably receive said handle the latter of elongated U-shape with one arm adapted to removably engage said tongue and both said arms adapted to be clasped and pressed toward each other and means on the free arm thereof arranged to be selectively clamped against the exterior fixed handle of a vessel or in contact with its bead and in proximity to said yieldable vessel engaging means of the cover.

In testimony whereof I affix my signature.

WILLIAM H. SCHMITT.